(12) United States Patent
Bonneville et al.

(10) Patent No.: US 7,490,448 B1
(45) Date of Patent: Feb. 17, 2009

(54) FORM-FILL-SEAL WEB PACKAGING SYSTEM WITH SEALING STATION

(75) Inventors: Craig R. Bonneville, Black Earth, WI (US); Ryan T. Gitzlaff, Poynette, WI (US); Daryl W. Shackelford, Waunakee, WI (US)

(73) Assignee: Alkar-RapidPak, Inc., Lodi, WI (US)

( * ) Notice: Subject to any disclaimer, the term of this patent is extended or adjusted under 35 U.S.C. 154(b) by 52 days.

(21) Appl. No.: 11/684,105

(22) Filed: Mar. 9, 2007

(51) Int. Cl.
*B65B 57/00* (2006.01)
*B65B 51/14* (2006.01)
*B65B 47/00* (2006.01)

(52) U.S. Cl. ............................. 53/75; 53/559; 53/329.3

(58) Field of Classification Search .................. 53/450, 53/453, 553, 559, 477, 478, 329.2–329.5, 53/75; 100/292
See application file for complete search history.

(56) References Cited

U.S. PATENT DOCUMENTS

| | | | | |
|---|---|---|---|---|
| 3,321,353 A * | 5/1967 | Zelnick | ...................... | 53/374.8 |
| 3,347,011 A * | 10/1967 | Lovas et al. | .................... | 53/433 |
| 3,354,611 A * | 11/1967 | Powell | ........................ | 53/559 |
| 3,358,591 A * | 12/1967 | Bradlee | ...................... | 100/257 |
| 3,538,677 A * | 11/1970 | Tollefsbol et al. | ............. | 53/299 |
| 3,925,139 A * | 12/1975 | Simmons | .................... | 156/358 |
| 3,965,656 A * | 6/1976 | Gerben | ........................ | 53/282 |
| 3,992,850 A | 11/1976 | Vetter | | |
| 4,502,908 A * | 3/1985 | von Wichert et al. | ........ | 156/350 |
| 4,794,224 A * | 12/1988 | Spektor et al. | ............... | 219/216 |
| 4,894,977 A * | 1/1990 | Rittinger et al. | ............... | 53/453 |
| 5,040,357 A * | 8/1991 | Ingemann et al. | ............. | 53/478 |
| 5,170,611 A | 12/1992 | Buchko et al. | | |
| 5,182,896 A * | 2/1993 | Maccherone | .................. | 53/478 |
| 5,205,110 A | 4/1993 | Buchko | | |
| 5,307,692 A * | 5/1994 | Kaplan | .................. | 73/862.541 |
| 5,438,883 A * | 8/1995 | McLean | ................ | 73/862.632 |
| 5,443,150 A | 8/1995 | Buchko | | |
| 5,475,965 A * | 12/1995 | Mondini | ....................... | 53/287 |
| 5,522,200 A * | 6/1996 | Foldesi et al. | .................. | 53/75 |
| 5,626,000 A * | 5/1997 | Edwards et al. | ............... | 53/281 |
| 5,682,729 A | 11/1997 | Buchko | | |
| 5,785,270 A | 7/1998 | Buchko | | |
| 5,819,510 A * | 10/1998 | Bochtler et al. | ............... | 53/559 |
| 5,930,977 A * | 8/1999 | Hsu | .......................... | 53/329.5 |
| 6,006,505 A * | 12/1999 | Natterer | ....................... | 53/559 |
| 6,085,490 A | 7/2000 | Buchko | | |
| 6,085,497 A * | 7/2000 | Natterer | ....................... | 53/559 |
| 6,167,677 B1 * | 1/2001 | Kammler et al. | ............... | 53/75 |
| 6,834,476 B2 * | 12/2004 | Konishi | ..................... | 53/329.5 |
| 6,843,043 B2 | 1/2005 | Hanson et al. | | |
| 7,196,290 B2 * | 3/2007 | Oliver et al. | ................. | 219/243 |
| 7,269,932 B2 * | 9/2007 | Konishi | ..................... | 53/329.5 |
| 7,383,671 B2 * | 6/2008 | Conti | ......................... | 53/131.3 |
| 2004/0112008 A1 * | 6/2004 | Voss et al. | .................. | 53/329.3 |

FOREIGN PATENT DOCUMENTS

| | | | |
|---|---|---|---|
| DE | 3141528 A1 * | 5/1983 | |
| JP | 55048500 A * | 4/1980 | |
| JP | 03029708 A * | 2/1991 | |

\* cited by examiner

*Primary Examiner*—Stephen F Gerrity
(74) *Attorney, Agent, or Firm*—Andrus, Sceales, Starke & Sawall, LLP

(57) ABSTRACT

A form-fill-seal web packaging system includes a pressure monitor at the sealing station monitoring sealing pressure. A bladderless actuator effects relative movement of dies and applies sealing pressure.

11 Claims, 8 Drawing Sheets

FORM-FILL-SEAL WEB PACKAGING SYSTEM WITH SEALING STATION

BACKGROUND AND SUMMARY

The invention relates to form-fill-seal web packaging systems. A form-fill-seal web packaging system packages a product. One type of packaged product is a food product, e.g. hotdogs, and other packaged food items. Other types of packaged products include non-food products. For example, there is a growing demand for one-time use disposable sterile medical products and devices. For packaging of these types of products, ultra high quality validate able sealing is critically important to maintain sterility while also allowing for easy peel access to the contents of the package. Such products may typically include disposable syringes, needles, baby bottles for premature infants, IV (intravenous) devices, surgical prep kits, sterile gloves, and so on.

A web transport conveyor transports the lower web from upstream to downstream through a series of stations which form the lower web into a component of a package, e.g. a pocket or downwardly depending cavity, at a forming station, and receive the product at a loading station into the lower web package, and close and seal the package with the upper web at a closing and sealing station, typically thermally adhesively sealing the upper and lower webs to each other. A pasteurization station may be provided between the loading station and the closing station for pasteurizing and/or sterilizing the product.

The present invention arose during continuing development efforts directed toward the above noted form-fill-seal web packaging systems, including improvements at the sealing station.

DETAILED DESCRIPTION

Figure 1:
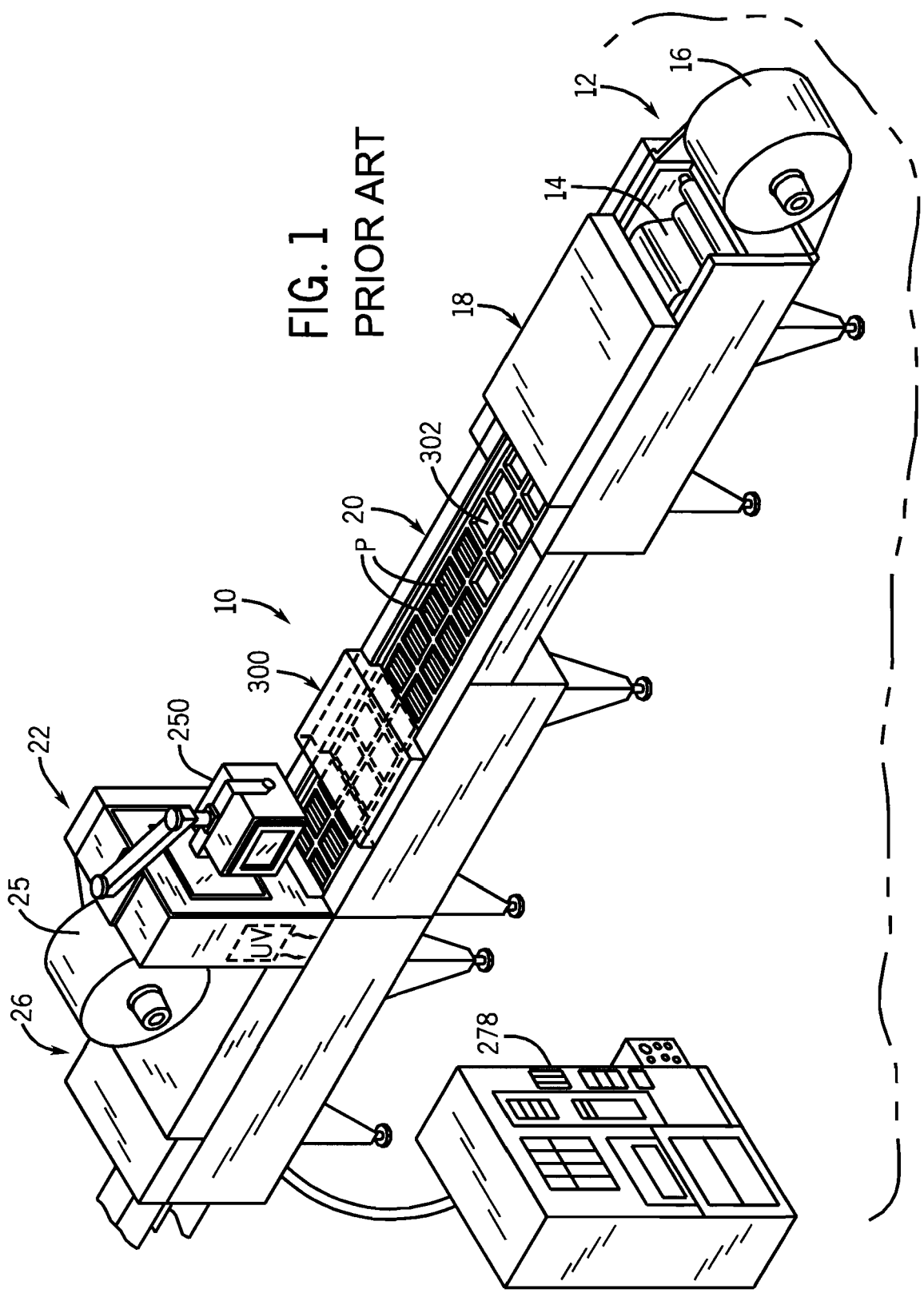
FIG. 1 is an isometric view of a form-fill-seal web packaging system.

FIG. 1 shows form-fill-seal web packaging apparatus 10, and is taken from, and uses like reference numerals from, U.S. Pat. Nos. 6,843,043 and 5,170,611, both incorporated herein by reference. As noted in the '043 and '611 patents, packaging apparatus 10 generally includes a lower web supply station 12 for supplying a lower web 14 of flexible packaging material from a supply roll 16, a forming station 18, a loading station 20, an upper web supply station 22 for supplying an upper web of flexible packaging material 25, and a downstream station 26 closing and sealing the package by thermally adhesively sealing the upper and lower webs at preapplied adhesive therebetween by moving at least one of upper and lower dies towards the other to respectively engage the upper and lower webs therebetween and apply heat and pressure to adhesively seal the upper and lower webs to each other, as is known. As described in the '043 and '611 patents, the web transport conveyor provided by apparatus 10 transports lower web 14 through the noted series of stations which form the lower web into a component of a package, e.g. a downwardly depending pocket or cavity, at forming station 18, and receive a product P at loading station 20, and close and seal the package with the upper web 25 at closing and sealing station 26. The webs are advanced by the indexing apparatus disclosed in the '611 patent, as controlled by the control modules 250 and 278, also as set forth in the '611 patent, to which further reference may be had. The conveyor advances from upstream to downstream, wherein closing and sealing station 26 is downstream of loading station 20, and loading station 20 is downstream of forming station 18. As disclosed in the '043 patent, a pasteurization station 300 may be provided between loading station 20 and closing and sealing station 26, for pasteurizing product P in product cavity pocket 302 in lower web 14.

FIGS. 2-9 show a sealing machine 400 for closing station 26 for thermally adhesively sealing upper and lower webs 25 and 14 of a package at sealing station 26. The sealing machine includes upper and lower dies 402 and 404, at least one of which is movable relative to the other such that the dies are relatively movable toward and away from each other as shown at arrows 406 and 408, FIGS. 9 and 8, respectively, to respectively engage and release upper and lower webs 25 and 14 therebetween and apply heat and pressure to thermally adhesively seal the upper and lower webs to each other. Sealant 409 is pre-applied to the upper web and/or lower web, as is standard. Also as is standard, the upper die includes one or more heater cartridges 410, FIG. 5, e.g. electrical resistance heaters, applying heat to activate the sealant to thermally adhesively seal the upper and lower webs to each other, which is preferred in the present system. It is typical and known in the prior art to monitor the control the parameters of temperature and time during the sealing operation to create a seal between the upper and lower webs using a thermally activated sealant. The present system, in one aspect, provides a pressure monitor, to be described, to additionally monitor sealing pressure.

Figure 2:
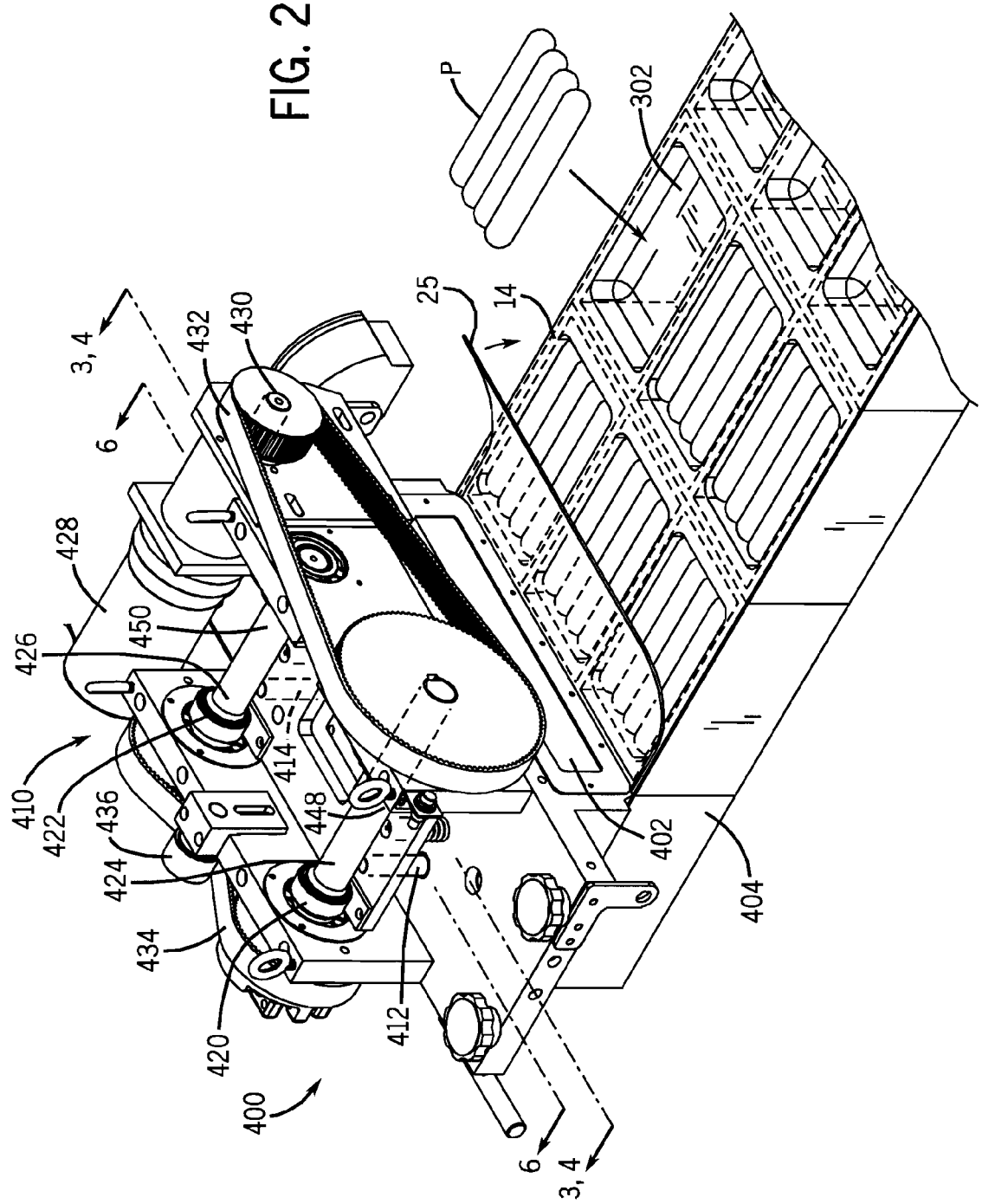
FIG. 2 is an enlarged isometric view of a portion of the system of FIG. 1 incorporating the present invention at the sealing station.
Figure 3:
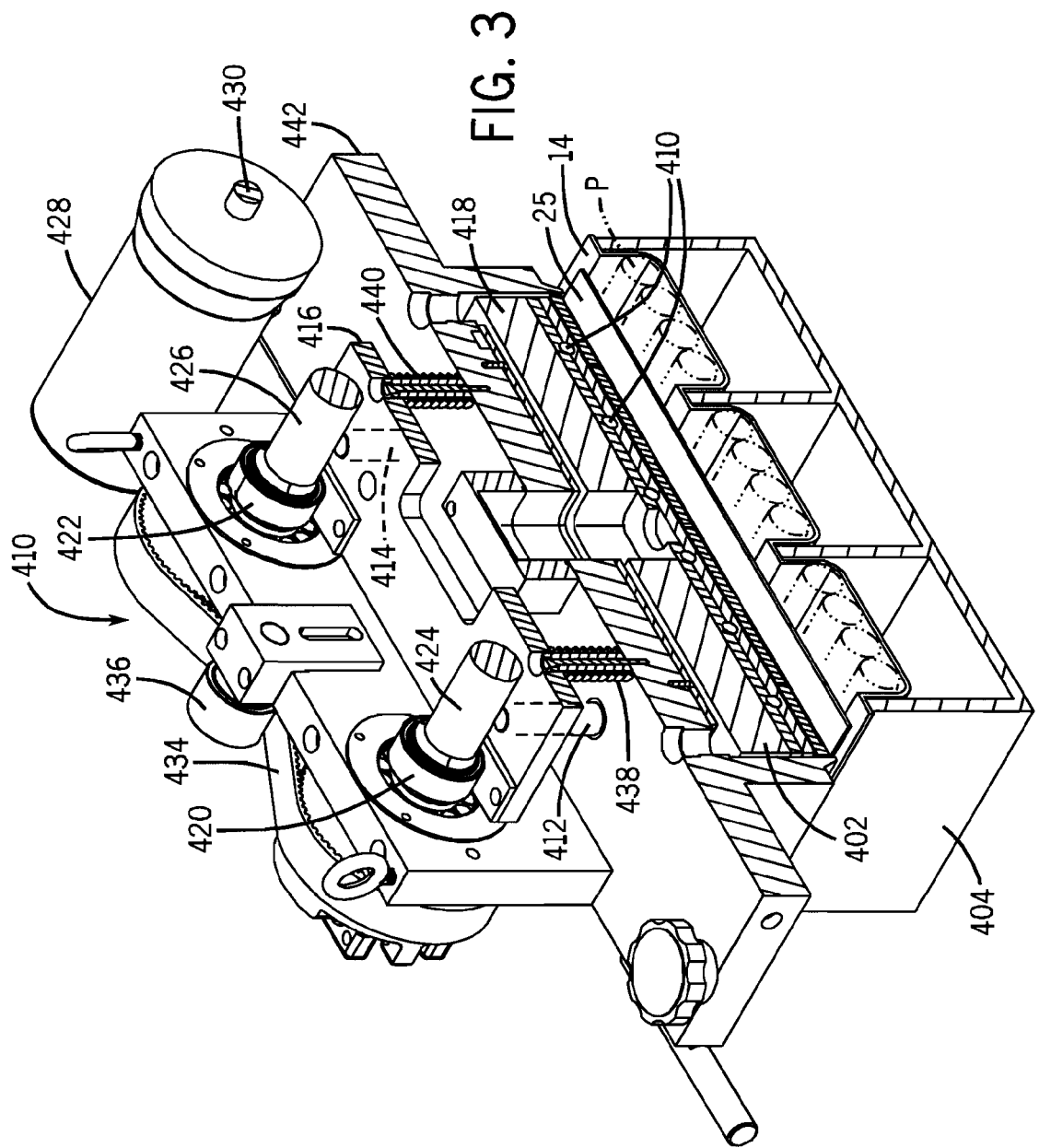
FIG. 3 is an isometric view of a portion of FIG. 2, with a section line taken along line 3-3 of FIG. 2.
Figure 5:
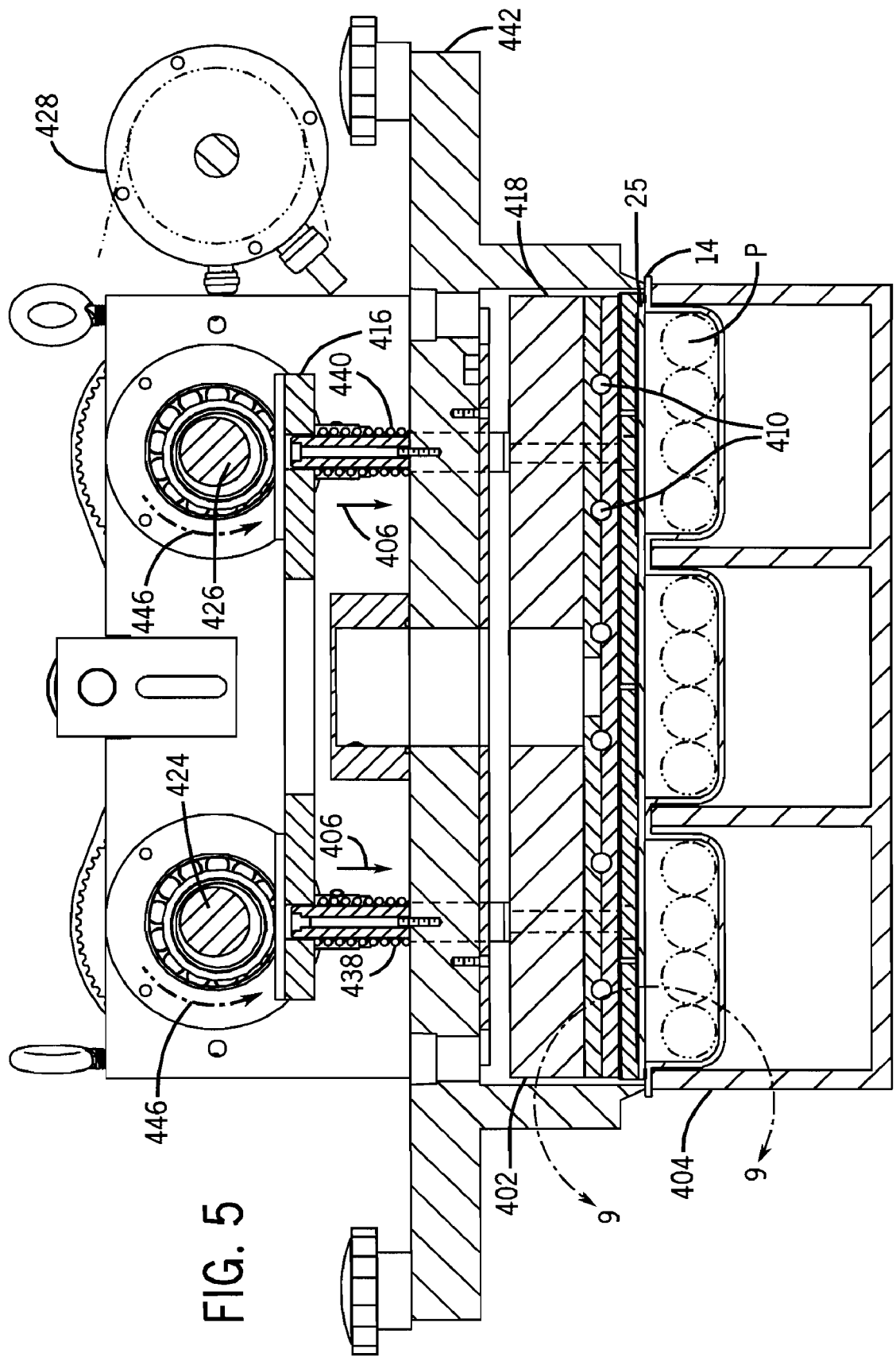
FIG. 5 is like FIG. 4 and shows a further operational position.
Figure 6:
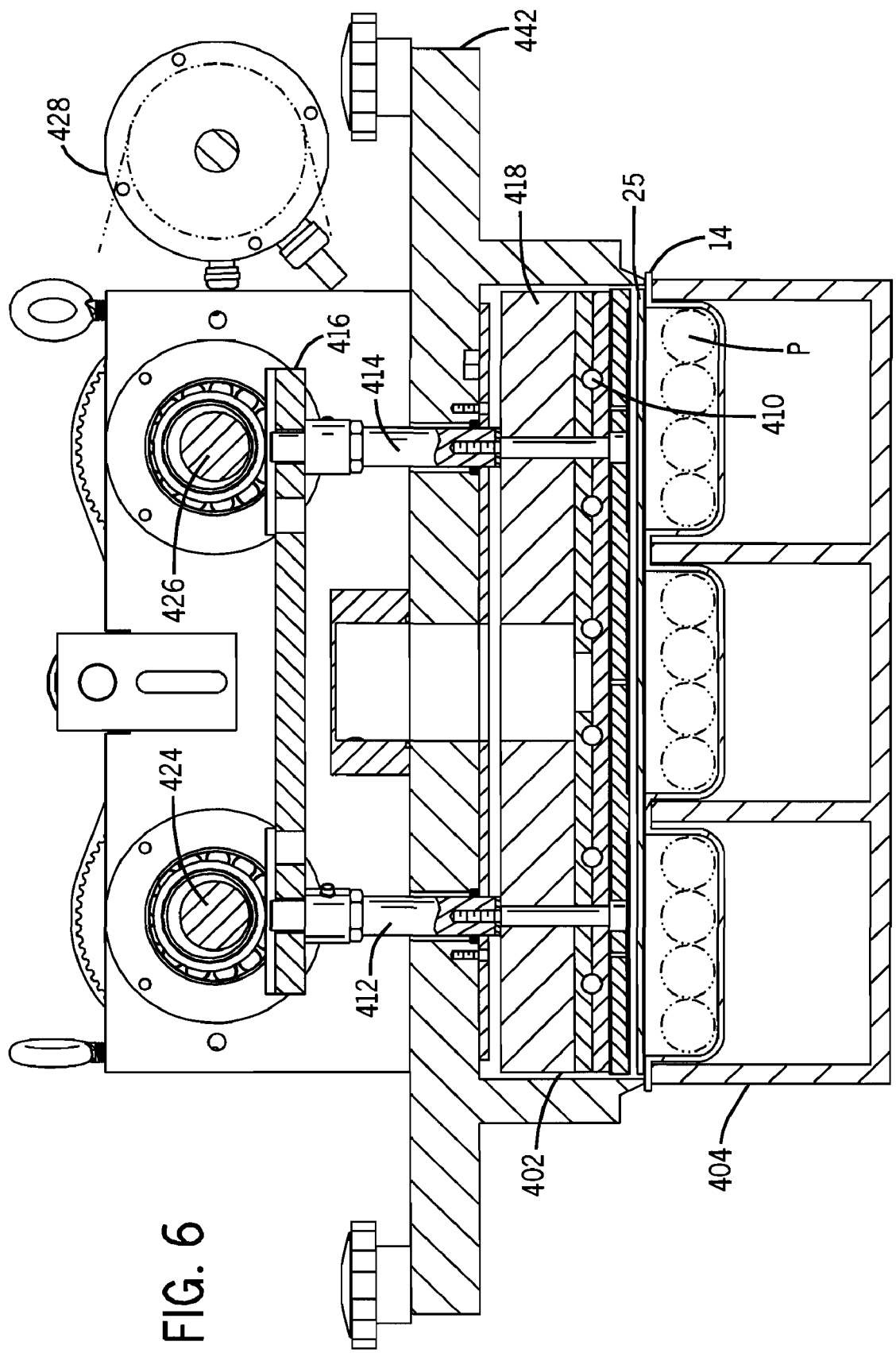
FIG. 6 is a sectional view taken along line 6-6 of FIG. 2.
Figure 7:
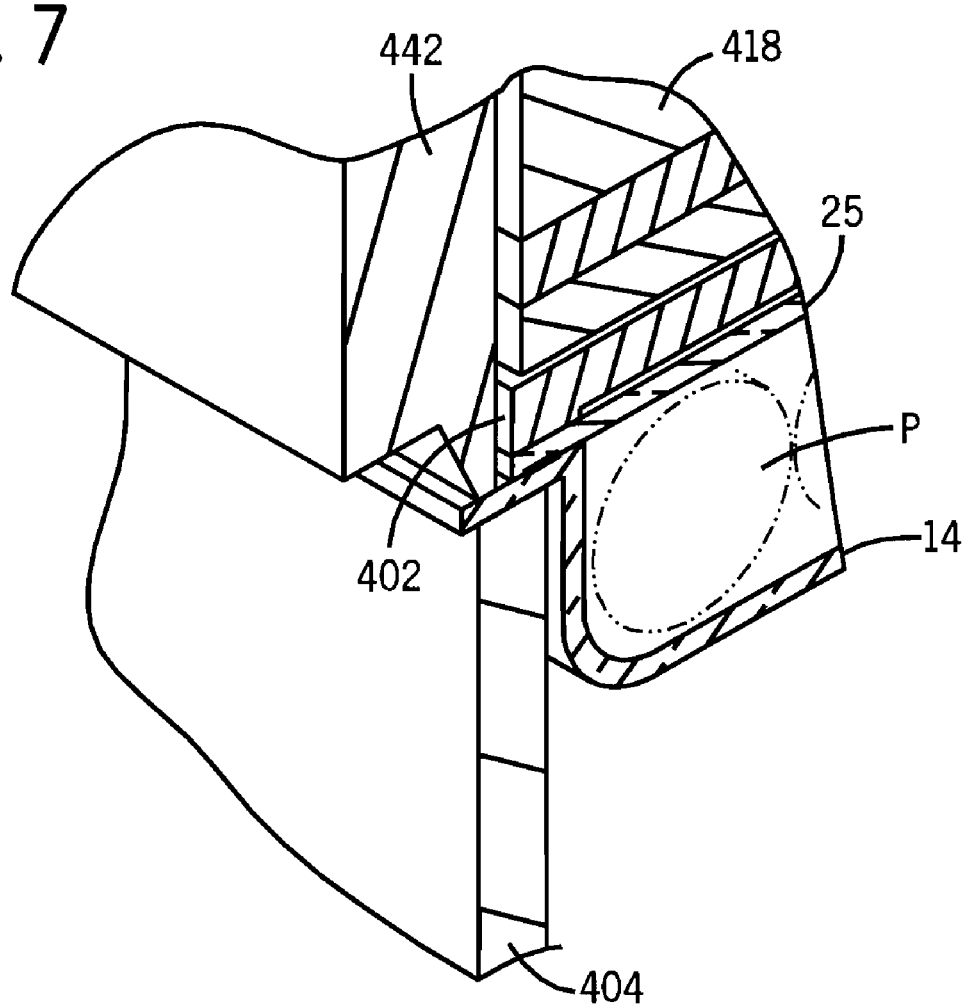
FIG. 7 is an enlarged view of a portion of FIG. 3.
Figure 8:
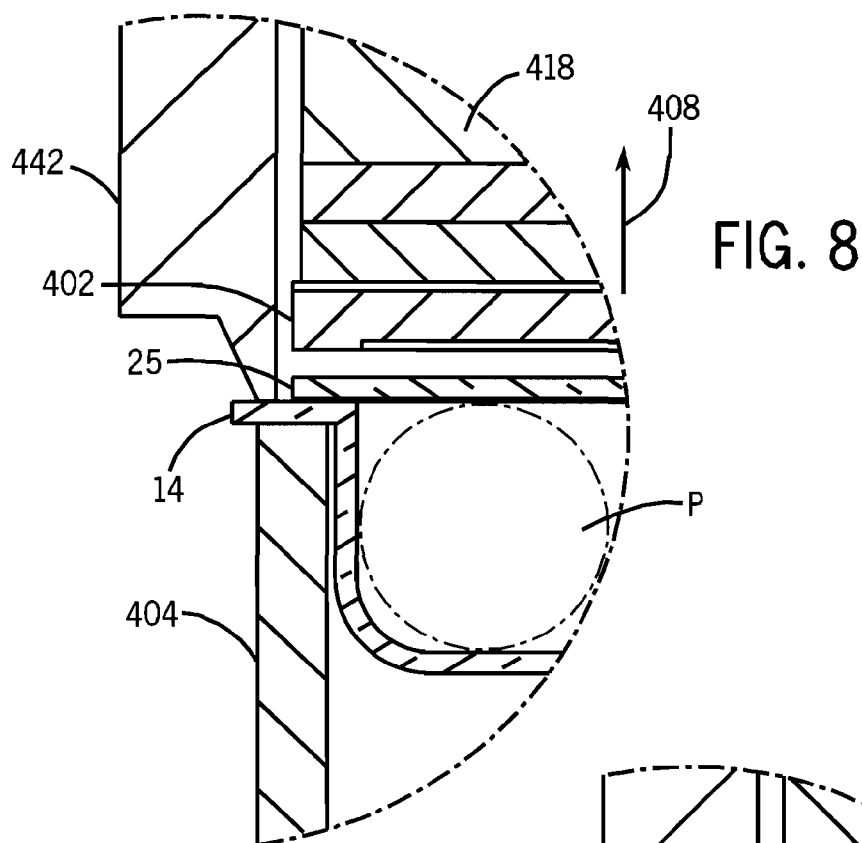
FIG. 8 is an enlarged view of a portion of FIG. 4 taken along line 8-8.
Figure 9:
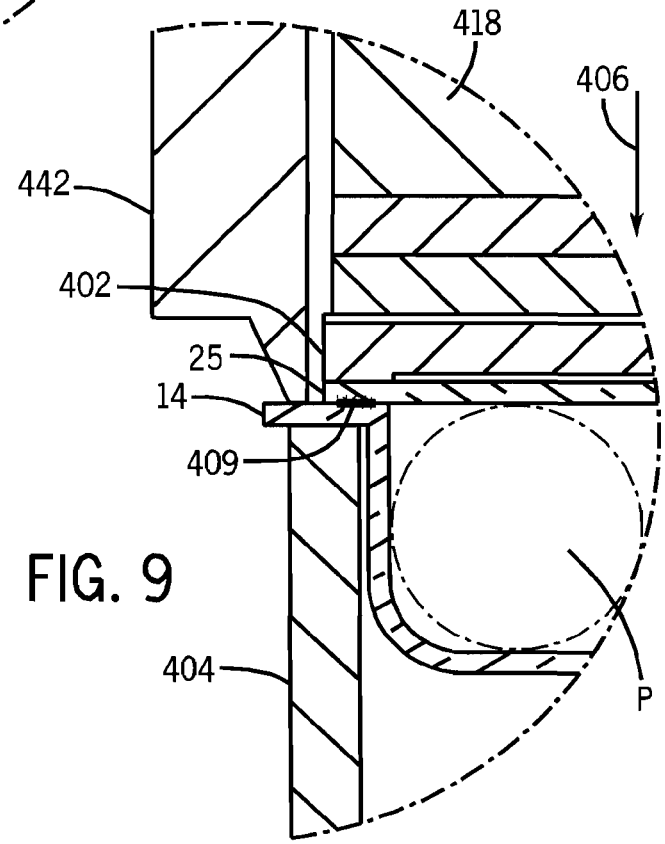
FIG. 9 is an enlarged view of a portion of FIG. 5 taken along line 9-9.

An actuator 410, FIG. 2, actuates the upper die 402 to move toward the lower die 404, FIGS. 5, 9. The pressure monitor is preferably provided by one or more sensors 412, 414, FIGS. 2, 3, 6, sensing the force applied by the actuator to the upper die. The one or more sensors 412, 414 are preferably provided by load cells through which the force is applied from the actuator to the upper die. Upper die 402 is provided by a pair of parallel horizontal plates 416 and 418, FIG. 3, spaced by load cells 412 and 414 therebetween, FIG. 6. Plate 416 is engaged by the actuator, to be described, to transfer force through load cells 412, 414 to plate 418 to apply sealing pressure to the webs, FIGS. 5, 7-9. Plate 418 is heated by heater cartridges 410 to apply heat to thermally adhesively seal the upper and lower webs to each other. Load cells 412 and 414 are laterally spaced from each other for sensing even distribution of sealing pressure across the plates for uniform sealing of the webs, and for sensing differential sealing pressure across the plates to detect nonparallel skewing of the plates relative to each other to in turn detect an obstruction at the webs.

The actuator 410 is provided by a plurality of laterally spaced cams such as 420, 422, FIGS. 2-6, on a respective plurality of laterally spaced shafts such as 424, 426 driven by a motor 428, preferably a servomotor, having an output shaft 430 driving via belt 432 the shaft 424 which in turn drives via belt 434 and idler tensioner pulley 436 the shaft 426. Shafts 424 and 426 are each rotatable to a first shaft position, FIG. 5, actuating the upper die to a sealing position to apply sealing pressure to the webs, and rotatable to a second shaft position, FIG. 4, to release the sealing pressure. Eccentric cams 420 and 422 engage plate 416 to apply force through respective load cells 412 and 414 to plate 418 to apply the noted sealing pressure. One or more return springs 438 and 440, FIGS. 3-5, bear against plate 416, such that the cams 420 and 422 engaging plate 416 must overcome the bias of the return springs 438 and 440 to apply force through the load cells 412 and 414 in a first direction 406 to plate 418. Return springs 438 and 440 bias plate 416 in a second direction 408 opposite to first direction 406, to bias the upper die away from the sealing position such that the upper die moves to a non-sealing position when shafts 424 and 426 rotate to the noted second shaft position. The lower ends of springs 438, 440 bear against a carriage 442 supporting the upper die, which carriage may be lowered downwardly to engage lower die box 404 at the outer peripheral edge of lower web 14, or which may remain stationary while lower die box 404 is raised upwardly for example as in FIGS. 2-5 of the '611 patent.

Figure 4:
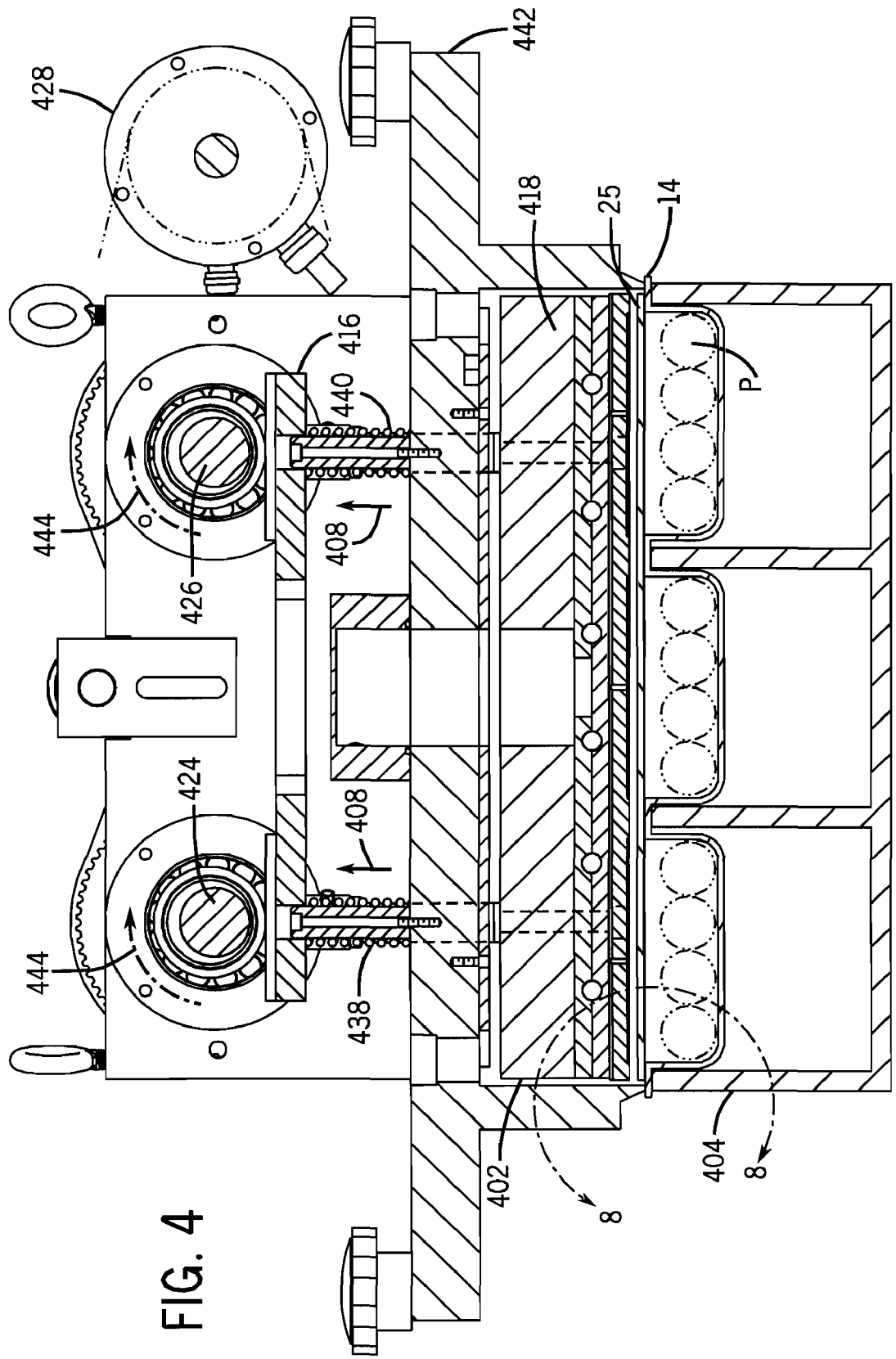
FIG. 4 is a sectional view taken along line 4-4 of FIG. 2.

Motor 428 is preferably a servomotor to drive each of shafts 424 and 426 in a first rotation direction, e.g. clockwise as shown at arrows 444 in FIG. 4, from the noted first shaft position (sealing) to the noted second shaft position (non-sealing), and in a second opposite rotation direction, e.g. counterclockwise as shown at arrows 446 in FIG. 5, from the noted second shaft position (non-sealing) to the noted first shaft position (sealing). Shaft 424 thus is driven to rotate in opposite rotation directions, namely in a first rotation direction 444 from the noted first shaft position to the noted second shaft position, and in a second opposite rotation direction 446 from the noted second shaft position to the noted first shaft position. Shaft 426 likewise is driven to rotate in opposite rotation directions, namely in the first rotation direction 444 from the noted first shaft position to the noted second shaft position, and in the second opposite rotation direction 446 from the noted second shaft position to the noted first shaft position. These opposite rotation directions of the shafts avoid the necessity of reaching a full bottom-dead-center engagement of cams 420, 422 and plate 416, which would require closer tolerance. That is, if shafts 424 and 426 only rotated in a single direction, the cams must pass through bottom-dead-center. Instead, motor 428 is preferably provided by a reversible servomotor to effect opposite rotation directions of the shafts, and avoid the necessity of reaching a full bottom-dead-center engagement of the cams and the upper die.

The described preferred actuator arrangement provides a bladderless actuator 410 actuating the upper die to move toward the lower die. Laterally spaced cams are preferably provided at 420 and 422 and are also preferably provided at the other ends 448 and 450 of shafts 424 and 426 and apply sealing pressure along first force direction 406 through laterally spaced load cells such as 412, 414 and such other load cells as may be desired, for example proximate the other ends 448 and 450 of the shafts, which laterally spaced load cells sense even distribution of sealing pressure across plates 416, 418 for uniform sealing of the webs, and sense differential sealing pressure across the plates to detect nonparallel skewing of the plates relative to each other to in turn detect an obstruction at the webs.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. In form-fill-seal web packaging apparatus including a sealing station, a sealing machine for adhesively sealing upper and lower webs of a package at said sealing station, comprising upper and lower dies at least one of which is movable relative to the other such that said dies are relatively movable toward and away from each other to respectively engage and release said upper and lower webs therebetween and apply pressure to adhesively seal said upper and lower webs to each other, and a pressure monitor monitoring said pressure, and comprising an actuator actuating said one die to move toward said other die, and wherein said pressure monitor comprises a sensor sensing force applied by said actuator to said one die, wherein said sensor comprises a load cell through which said force is applied from said actuator to said one die, wherein said one die comprises a pair of parallel plates spaced by a plurality of load cells therebetween, a first of said plates being engaged by said actuator to transfer force through said load cells to the second of said plates to apply sealing pressure to said webs, said load cells being laterally spaced from each other and sensing even distribution of sealing pressure across said plates for uniform sealing of said webs, and sensing differential sealing pressure across said plates to detect nonparallel skewing of said plates relative to each other to in turn detect an obstruction at said webs.

2. In form-fill-seal web packaging apparatus including a sealing station, a sealing machine for adhesively sealing upper and lower webs of a package at said sealing station, comprising upper and lower dies at least one of which is movable relative to the other such that said dies are relatively movable toward and away from each other to respectively engage and release said upper and lower webs therebetween and apply pressure to adhesively seal said upper and lower webs to each other, and a pressure monitor monitoring said pressure, and comprising an actuator actuating said one die to move toward said other die, and wherein said pressure monitor comprises a sensor sensing force applied by said actuator to said one die, wherein said sensor comprises a load cell through which said force is applied from said actuator to said one die, wherein said one die comprises a pair of plates spaced by said load cell therebetween, said actuator comprises a cam on a shaft rotatable to a first shaft position actuating said one die to a sealing position to apply sealing pressure to said webs, and rotatable to a second shaft position to release said sealing pressure, said cam engaging a first of said plates to apply force through said load cell to the second of said plates to apply said sealing pressure.

3. The form-fill-seal web packaging apparatus sealing machine according to claim 2 comprising a return spring bearing against a first of said plates and wherein said cam engaging said first plate must overcome the bias of said return spring to apply force through said load cell in a first direction to the second of said plates, said return spring biasing said first plate in a second direction opposite to said first direction to bias said one die away from said sealing position such that said one die moves to a non-sealing position when said shaft rotates to said second shaft position.

4. The form-fill-seal web packaging apparatus sealing machine according to claim 2 wherein said shaft is driven to rotate in opposite rotation directions, namely in a first rotation direction from said first shaft position to said second shaft position, and in a second opposite rotation direction from said second shaft position to said first shaft position, to avoid the necessity of reaching a full bottom-dead-center engagement of said cam and said first plate.

5. In form-fill-seal web packaging apparatus including a sealing station, a sealing machine for adhesively sealing upper and lower webs of a package at said sealing station, comprising upper and lower dies at least one of which is movable toward and away from the other to respectively engage and release said upper and lower webs therebetween and apply pressure to seal said upper and lower webs to each other, and a bladderless actuator actuating said one die to move toward said other die, wherein said actuator comprises a plurality of laterally spaced cams on a plurality of laterally spaced shafts each rotatable to a first shaft position actuating said one die to a sealing position to apply sealing pressure to said webs, and rotatable to a second shaft position to release said sealing pressure, said cams engaging said one die to apply said sealing pressure.

6. The form-fill-seal web packaging apparatus sealing machine according to claim 5 wherein said cams apply said sealing pressure along a first force direction, and comprising one or more return springs bearing against said one die and biasing said one die in a second direction opposite to said first direction such that said one die moves to a non-sealing position when said shafts rotate to said second shaft position.

7. The form-fill-seal web packaging apparatus sealing machine according to claim 5 wherein said shafts are driven to rotate in a first rotation direction from said first shaft position to said second shaft position, and in a second opposite rotation direction from said second shaft position to said first shaft position, to avoid the necessity of reaching a full bottom-dead-center engagement of said cams and said one die.

8. In form-fill-seal web packaging apparatus including a sealing station, a sealing machine for thermally adhesively sealing upper and lower webs of a package at said sealing station, comprising upper and lower dies at least one of which is movable toward and away from the other to respectively engage and release said upper and lower webs therebetween and apply heat and pressure to thermally adhesively seal said upper and lower webs to each other, said one die comprising a pair of spaced parallel plates, a plurality of load cells between said plates, said load cells being laterally spaced from each other, an actuator comprising a plurality of cams on a plurality of shafts each rotatable to a first shaft position actuating said one die to a sealing position to apply sealing pressure to said webs, and rotatable to a second shaft position to release said sealing pressure, said cams engaging a first of said plates to apply force through said load cells to the second of said plates to apply said sealing pressure, said second plate being heated to apply heat to thermally adhesively seal said upper and lower webs to each other, said laterally spaced load cells sensing even distribution of sealing pressure across said plates for uniform sealing of said webs, and sensing differential sealing pressure across said plates to detect non-parallel skewing of said plates relative to each other to in turn detect an obstruction at said webs.

9. Form-fill-seal web packaging apparatus packaging a product between upper and lower webs, comprising a web transport conveyor transporting said lower web from upstream to downstream through a series of stations receiving the product in a lower web package at a loading station, and closing and sealing the package with the upper web at a closing and sealing station thermally adhesively sealing said upper and lower webs, said sealing station comprising upper and lower dies at least one of which is movable toward and away from the other to respectively engage and release said upper and lower webs therebetween and apply heat and pressure to thermally adhesively seal said upper and lower webs to each other, and a pressure monitor monitoring said sealing pressure, and comprising a bladderless actuator actuating said one die to move toward said other die, and wherein said pressure monitor comprises a sensor sensing force applied by said bladderless actuator to said one die, wherein said sensor comprises a load cell through which said force is applied from said actuator to said one die, wherein said one die comprises a pair of parallel plates spaced by a plurality of load cells therebetween, a first of said plates being engaged by said actuator to transfer force through said load cells to the second of said plates to apply sealing pressure to said webs, said load cells being laterally spaced from each other and sensing even distribution of sealing pressure across said plates for uniform sealing of said webs, and sensing differential sealing pressure across said plates to detect non-parallel skewing of said plates relative to each other to in turn detect an obstruction at said webs.

10. Form-fill-seal web packaging apparatus packaging a product between upper and lower webs, comprising a web transport conveyor transporting said lower web from upstream to downstream through a series of stations receiving the product in a lower web package at a loading station, and closing and sealing the package with the upper web at a closing and sealing station thermally adhesively sealing said upper and lower webs, said sealing station comprising upper and lower dies at least one of which is movable toward and away from the other to respectively engage and release said upper and lower webs therebetween and apply heat and pressure to thermally adhesively seal said upper and lower webs to each other, and a pressure monitor monitoring said sealing pressure, and comprising a bladderless actuator actuating said one die to move toward said other die, and wherein said pressure monitor comprises a sensor sensing force applied by said bladderless actuator to said one die, wherein said sensor comprises a load cell through which said force is applied from said actuator to said one die, wherein said one die comprises a pair of plates spaced by said load cell therebetween, said actuator comprises a cam on a shaft rotatable to a first shaft position actuating said one die to a sealing position to apply sealing pressure to said webs, and rotatable to a second shaft position to release said sealing pressure, said cam engaging a first of said plates to apply force through said load cell to the second of said plates to apply said sealing pressure.

11. The form-fill-seal web packaging apparatus according to claim 10 wherein said shaft is driven to rotate in opposite rotation directions, namely in a first rotation direction from said first shaft position to said second shaft position, and in a second opposite rotation direction from said second shaft position to said first shaft position, to avoid the necessity of reaching a full bottom-dead-center engagement of said cam and said first plate.

* * * * *